K. J. ALMFELT.
MOUNTING OF SPINDLES OF GRINDING MACHINES, MACHINE TOOLS, AND OTHER MACHINERY.
APPLICATION FILED JULY 9, 1919.
1,364,675.
Patented Jan. 4, 1921.
2 SHEETS—SHEET 1.
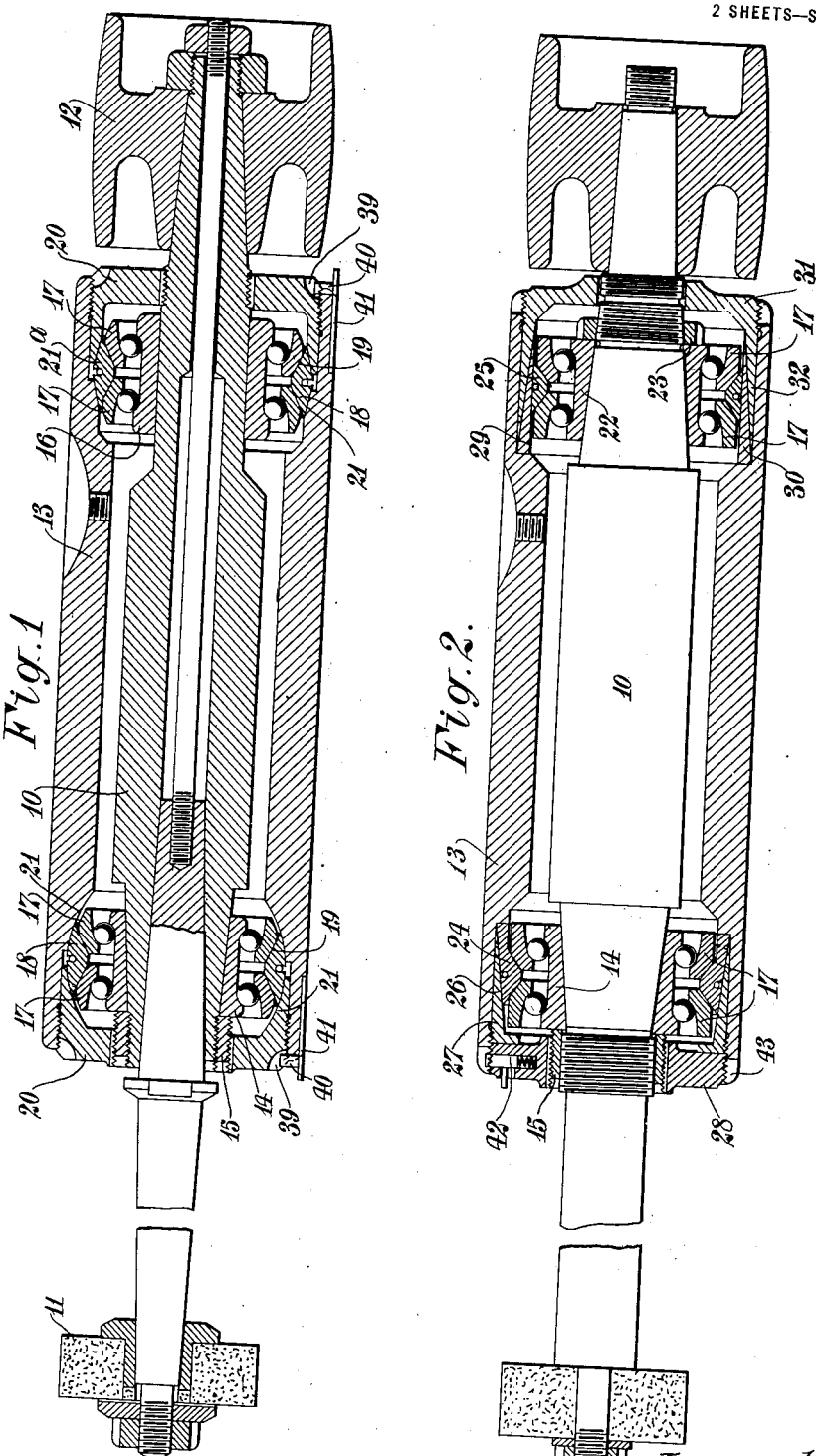

UNITED STATES PATENT OFFICE.

KARL JOHAN ALMFELT, OF BIRMINGHAM, ENGLAND.

MOUNTING OF SPINDLES OF GRINDING-MACHINES, MACHINE-TOOLS, AND OTHER MACHINERY.

1,364,675.

Specification of Letters Patent.   Patented Jan. 4, 1921.

Application filed July 9, 1919. Serial No. 309,682.

*To all whom it may concern:*

Be it known that I, KARL JOHAN ALMFELT, a subject of His Majesty the King of Sweden, and resident of Sparkhill, Birmingham, in the county of Warwick, Kingdom of England, have invented certain new and useful Improvement in or Connected with the Mounting of Spindles or Grinding-Machines, Machine-Tools, and other Machinery, of which the following is a specification.

This invention relates to the mounting of the spindles of grinding machines, machine tools and other machinery in which said spindles have to run very accurately and at high speed.

It has heretofore been proposed to provide a mounting or support for spindles, of the kind above specified, in which the spindle is mounted in ball bearings disposed at both ends of a supporting sleeve, the balls of which bearings are self-alining and which bearings are separately adjustable, and in which the set of bearings at one end of the spindle are mounted as a complete unit in a ring or housing free to slide longitudinally within the corresponding end of the sleeve to compensate for expansion and contraction of the spindle.

The present invention has for its object to improve the construction of such mountings or supports and render them more efficient, and for these purposes, and in carrying out the invention, improved means are provided for adjusting the bearings and for allowing for expansion and contraction of the spindles, and the whole of the bearings including their outer race rings may be self-alining.

The invention will now be described with reference to the accompanying drawings, in which:—

Figure 1 is a longitudinal sectional elevation showing one method of carrying out the invention.

Fig. 2 is a similar view of a modified method;

Figure 3:
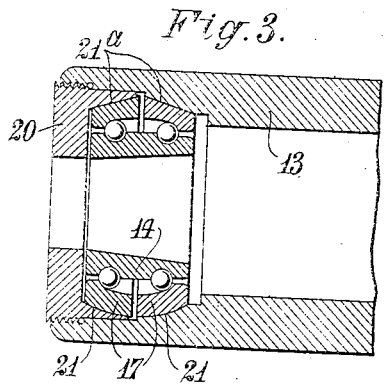
Figs. 3 and 4 are sectional elevations showing two further modifications.

In the method of carrying out the invention illustrated in Fig. 1, the built-up spindle 10 carrying a grinding tool 11 at one end and a driving pulley 12 at its other end is mounted in ball bearings disposed within both ends of a supporting sleeve 13. At one end of the sleeve 13 the spindle 10 is tapered and fitted with an inner race ring 14 which is common to two series of antifriction balls and firmly held in place upon the spindle by means of a follower nut 15, while at the other end of the sleeve the spindle is of cylindrical shape and fitted with an inner race ring 16 also common to two series of balls. Two outer race rings 17, one ring for each series of balls, are provided at each end of the sleeve 13, and each pair of the rings 17 are adapted to be adjusted apart from one another, to compensate for wear and looseness of the bearings, by means of a split bearing adjusting ring 18 the conical inner surfaces 19 of which bear upon corresponding conical outer surfaces on the rings 17, and which ring 18 is adapted to be pressed upon the rings 17 by means of an end cap 20 adjustably screwed into the adjacent end of the sleeve 13. The inner surfaces of the left hand cap 20 and of the sleeve 13 may be spherical as shown at 21 or conical if desired; similarly, the inner surfaces of the right hand cap 20 and of the sleeve 13 may be spherical as at 21 or conical as at 21ª. The spherical or conical surfaces of the caps and sleeve coöperate with correspondingly shaped outer surfaces on the rings 18.

Figure 8:
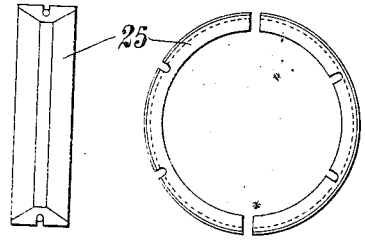
Fig. 8 shows an edge elevation of one half portion of one of the bearing adjusting rings illustrated in Fig. 2 and a side elevation of said ring complete.

In the modified construction shown in Figs. 2 and 8 both ends of the spindle 10 are tapered and fitted with inner race rings 14 and 22 which are retained in place by follower nuts 15 and 23. The pairs of outer race rings 17 at the two ends of the sleeve 13 are adjusted for wear of the bearings by means of split rings 24 and 25, and in this form of the invention the two rings 24 and 25, are differently constructed in relation to one another and two modified means are provided for operating said rings. The ring 24 is formed with a conical outer surface which coöperates with a correspondingly conical inner surface 26 on a solid pressure collar 27 which latter is provided with a cylindrical outer surface and mounted to slide within the adjacent end of the sleeve 13 and is adapted to be adjusted therein, to press upon the ring 24, by means of an end disk 28 adjustably screwed into said end of the sleeve. The ring 25 is formed of two half portions and provided with a cylindrical outer surface which coöperates with a cylindrical inner surface 29 on a split pressure collar 30, which latter is pressed onto the ring 25 by an end cap 31 adjustably screwed into the adjacent end of the sleeve 13. As shown the pressure collar 30 is formed with a conical outer surface 32 to coöperate with a correspondingly shaped inner surface on the cap 31.

Figure 4:
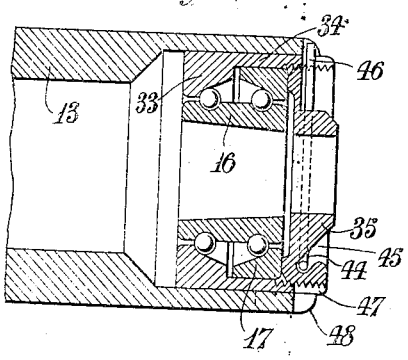

In either of the forms of the mounting shown in Figs. 1 and 2 the left hand bearings may be modified and constructed such as shown in Fig. 3, or the right hand bearings can be modified and constructed such as shown in Fig. 4, and in fact, according to the invention, the bearings could vary in many ways so long as the bearings at one or both ends of the mounting are adjusted by means of a bearing adjusting ring or rings adapted to coöperate with the outer race rings and formed in the manner above described with reference to Figs. 1 and 2 or as modifications thereof such as hereinafter explained. In Fig. 3 the bearings shown are constructed very much the same as the left hand bearings of Fig. 1 and differ from the latter mainly in that the bearing adjusting ring is omitted; in this form the bearings can be tightened by means of an end cap 20 adjustably screwed into the corresponding end of the sleeve 13, and the outer surfaces of the rings 17 may be spherical as at 21 or conical as at 21ª. In Fig. 4 one of the outer race rings 33 is formed integrally with a housing 34 adapted to slide longitudinally within the corresponding end of the sleeve 13, and the bearings are tightened by means of an end cap 35 adjustably screwed into the end of said housing.

Figure 6:
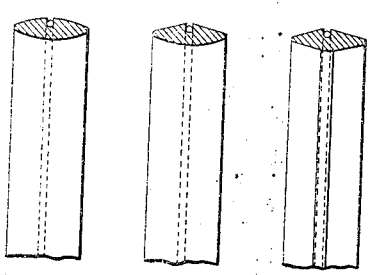
Fig. 6 shows cross section detail views of modified constructions of the bearing adjusting rings.

Fig. 6 shows bearing adjusting rings of various modified cross sectional shapes which may be used in the mountings shown in Figs. 1 and 2 if the shapes of the outer surfaces of the outer race rings 17 and the inner surfaces of the members which coöperate with the outer surfaces of said adjusting rings are suitably modified.

Figure 7:
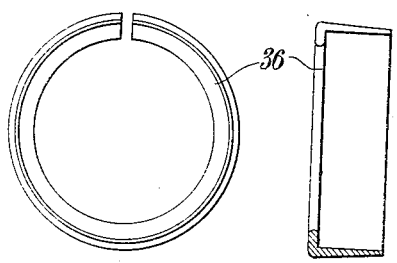
Fig. 7 shows a side elevation and a cross sectional elevation of a modified form of pressure collar.

The modified pressure collar 36 shown in Fig. 7 is split and formed with a cylindrical inner surface and a conical outer surface.

Figure 5:
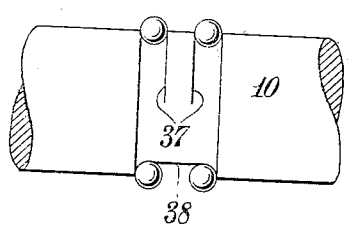
Fig. 5 shows two modified forms of inner races.

The mountings above described are particularly adaptable for heavy types of spindles, but if they are applied to lighter spindles the inner race rings 14, 16 and 22 may be dispensed with and the inner races for the bearing balls may be formed in the spindles themselves such as illustrated at 37 or 38 in Fig. 5.

Although double bearings each with two series of balls are provided at each end of the mountings shown in Figs. 1 to 5 of the drawings, a third series of balls may be furnished if desired, and in this case the innermost series of balls may be non-adjustable and, in the event of wear, could be replaced by balls of slightly larger diameter and known in the trade as "plus" balls.

The outer ball races on the outer race rings 17 and 33 of Figs. 1 to 4 may be of any suitable shape, in Figs. 1, 2 and 3 they are shown as being of spherical shape, while in Fig. 4 they are of conical formation.

It will be appreciated that when the meeting surfaces of the rings 18 or 17, caps 20 and sleeve 13 are spherical in the forms of bearings illustrated in Figs. 1 and 3 said bearings are each self alining as a whole within the sleeves 13 and the end caps 20, and that the bearing adjusting rings 18 of Fig. 1 move with their respective bearings. The cylindrical formation of the right hand end of the spindle 10 in Fig. 1, of the outer surface of the ring 25 in Fig. 2, and of the outer surface of the housing 34 in Fig. 4, provides means whereby the spindle 10 can slide longitudinally in the inner race ring 16 in Fig. 1, the ring 25 can slide in the pressure collar 30 in Fig. 2, and the housing 34 can similarly move in the corresponding end of the sleeve 13 in Fig. 4, thus compensating any expansion and contraction of the spindles that may occur at these points.

Means are preferably provided for locking the end caps 20, 28, 31 and 35 in their adjusted positions, and the drawings illustrate various devices that may be employed for this purpose. In Fig. 1 each end cap 20 is formed with a circular series of recesses 39 into any one of which a pin 40 is adapted to engage, said pin being carried by a blade spring 41 secured to the sleeve 13; Fig. 2 shows a modified device consisting of a spring pressed plunger 42 carried by the end cap 28 and adapted to engage recesses 43 formed in the end of the sleeve 13, similar or other suitable means being provided to lock the other end cap 31; in Fig. 4 a spring wire ring 44 is mounted within an annular groove 45 formed in the end cap 35 and is formed with an outwardly extending finger 46 which can engage recesses 47 and 48 formed in the housing 34 and sleeve 13, respectively.

The construction of the bearings, of the bearing adjusted rings and of the means employed for operating said rings, and the means used for allowing for relative expansion and contraction of the parts and for locking the end caps in adjusted positions may all be modified in several ways so long as the modifications fall within the scope of the appended claims.

What I claim is:—

1. In apparatus of the character described, a sleeve provided near its ends with inner inclined walls, a spindle arranged within the sleeve in spaced relation, inner race rings carried by the ends of the spindle, a pair of outer race rings arranged about each inner race ring and having inner inclined walls, balls arranged between each inner race ring and the surrounding pair of outer race rings, and a split adjusting ring arranged between each pair of outer race rings and having inclined faces to engage therewith.

2. In apparatus of the character described, a sleeve provided near its ends with inner inclined walls, a spindle arranged within the sleeve and spaced therefrom, inner race rings carried by the ends of the spindle and having end walls, a pair of outer race rings arranged about each inner race ring and having inner inclined walls, balls arranged between each inner race ring and the surrounding pair of outer race rings, a split adjusting ring arranged between each pair of outer race rings and having inner inclined faces to engage therewith and outer inclined faces, one outer inclined face engaging the adjacent inner inclined wall of the sleeve, and an element having screw-threaded engagement with the end of the sleeve and having an inclined face to engage the other outer inclined face of the adjusting ring.

3. A spindle mounting comprising a sleeve surrounding the spindle, a ball bearing for the end of the spindle within the sleeve, said ball bearing comprising a pair of race rings forming the outer members of the ball bearing, wedging means and operative means for actuating the wedging means from beyond the sleeve whereby said race rings may be given opposite motion lengthwise the sleeve to adjust the ball receiving space formed by said rings.

4. In apparatus of the character described, a sleeve provided near its ends with inner inclined walls, a spindle arranged within the sleeve in spaced relation, inner race rings carried by the ends of the spindle, a pair of outer race rings arranged about each inner race ring and having inner inclined walls, balls arranged between each inner race ring and the surrounding pair of outer race rings, and an adjusting ring arranged between each pair of outer race rings and having inclined faces to engage therewith.

5. In apparatus of the character described, a sleeve provided near its ends with inner inclined walls, a spindle arranged within the sleeve and spaced therefrom, inner race rings carried by the ends of the spindle and having end walls, a pair of outer race rings arranged about each inner race ring and having inner inclined walls, balls arranged between each inner race ring and the surrounding pair of outer race rings, an adjusting ring arranged between each pair of outer race rings and having inner inclined faces to engage therewith and outer inclined faces, one outer inclined face engaging the adjacent inner inclined wall of the sleeve, and an element having screw-threaded engagement with the end of the sleeve and having an inclined face to engage the other outer inclined face of the adjusting ring.

In testimony whereof I have hereunto set my name.

K. J. ALMFELT.